US007562043B2

(12) United States Patent
Brown et al.

(10) Patent No.: US 7,562,043 B2
(45) Date of Patent: Jul. 14, 2009

(54) METHOD, SYSTEM, AND PROGRAM FOR IMPLEMENTING AN AUCTION USING CALENDAR INFORMATION

(75) Inventors: Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1804 days.

(21) Appl. No.: 09/895,244

(22) Filed: Jun. 29, 2001

(65) Prior Publication Data

US 2003/0004856 A1    Jan. 2, 2003

(51) Int. Cl.
*G06Q 30/00*    (2006.01)
(52) U.S. Cl. ........................................ 705/37
(58) Field of Classification Search ............. 705/37–44, 705/4, 5, 6
See application file for complete search history.

(56) References Cited

U.S. PATENT DOCUMENTS

| | | | |
|---|---|---|---|
| 5,124,912 A | 6/1992 | Hotaling et al. | |
| 5,416,473 A | 5/1995 | Dulaney, III | |
| 5,428,784 A | 6/1995 | Cahill, Jr. | |
| 5,664,063 A | 9/1997 | Johnson et al. | |
| 5,664,175 A | 9/1997 | Jackson et al. | |
| 5,732,398 A * | 3/1998 | Tagawa ........................... | 705/5 |
| 5,774,873 A | 6/1998 | Berent et al. | |
| 5,790,974 A | 8/1998 | Tognazzini | |
| 5,832,489 A | 11/1998 | Kucala | |
| 5,835,896 A | 11/1998 | Fisher et al. | |
| 5,890,138 A | 3/1999 | Godin et al. | |

(Continued)

FOREIGN PATENT DOCUMENTS

EP    0495622    1/1992

(Continued)

OTHER PUBLICATIONS

"Lotus Notes 4.5 and the Internet" by Jan Calabria with Sue Plumley, ISBN:0-7897-0975-9, Que, 1997 (9 pages phtotcopied and attached).*

(Continued)

*Primary Examiner*—James P Trammell
*Assistant Examiner*—Hai Tran
(74) *Attorney, Agent, or Firm*—Matthew W. Baca; David W. Victor

(57) ABSTRACT

Provided is a method, system, and program for implementing an auction. Scheduled event records for a user are maintained within a computer database, wherein each scheduled event record indicates a scheduled event for the user at a calendar time slot. A request is received for bids for a service from the user indicating a time period, wherein the service is to be performed during a calendar time slot within the indicated time period. A determination is made of scheduled event records for the user within the indicated time period. A template is generated to display a calendar for the indicated time period showing time slots. Available time slots comprise time slots in the indicated time period that do not include one scheduled event as indicated in the scheduled event records. At least one bid for the service is received for one available time slot in which the service is to be performed, wherein the bid indicates an amount.

41 Claims, 12 Drawing Sheets

U.S. PATENT DOCUMENTS

| | | | |
|---|---|---|---|
| 5,918,158 | A | 6/1999 | LaPorta et al. |
| 6,047,260 | A | 4/2000 | Levinson |
| 6,047,274 | A * | 4/2000 | Johnson et al. ............. 705/412 |
| 6,085,166 | A | 7/2000 | Beckhardt et al. |
| 6,101,480 | A | 8/2000 | Conmy et al. |
| 6,154,172 | A | 11/2000 | Piccionelli et al. |
| 6,993,503 | B1 * | 1/2006 | Heissenbuttel et al. ........ 705/37 |

FOREIGN PATENT DOCUMENTS

| | | |
|---|---|---|
| EP | 0637807 | 7/1994 |
| EP | 0834840 | 9/1997 |
| EP | 1039397 | 9/2000 |
| WO | 0029979 | 5/2000 |

OTHER PUBLICATIONS

Gans, Joshua; Danny price and Kim Woods, "Contracts and electricity pool prices" Australian Journal of Management, Jun. 1998, vol. 23, issue 1, pp. 1-8, (8 pages attached).*

U.S. Appl. No. 09/848,166, filed on May 3, 2001, entitled "Method System and Program for Providing User Location Information with a Personal Information Management Program," by MW Brown; R Dutta and MA Paolini.

U.S. Appl. No. 09/848,176, filed on May 3, 2001, entitled "Method, System and Program for Mining Data in a Personal Information Manager Database," by MW Brown; R Dutta and MA Paolini.

U.S. Appl. No. 09/848,173, filed on May 3, 2001, entitled "Method, System and Program for Providing User Location Information for a Personal Information Management System from Transmitting Devices," by MW Brown; R Dutta and MA Paolini.

U.S. Appl. No. 09/888,471, filed on Jun. 25, 2001, entitled "Method, System and Program for Accessing Calendar Information for Shadowed Users from a Database," by RW Bassett; MW Brown; R Dutta and MA Paolini.

Beadle, H.W., et al. "*Using Location and Environment Awareness in Mobile Communications.*" International Conference on Information, Communications and Signal Processing. ICICS. Singapore Sep. 9-12, 1997, pp. 1781-1785. New York, NY, USA, IEEE.

Manandhar, Sanjay. "*Activity Server: You Can Run but You Can't Hide.*" Proceedings of the Summer Usenix Conference Proceedings, pp. 299-311, Jun. 10-14, 1991, Nashville, TN, US (1991) Berkeley, CA, US.

Want, R. et al. "*The Active Badge Location System.*" ACM Transactions on Information Systems 10 (1992), pp. 91-102, January, No. 1, New York, US.

Hancock, Bill. "*Wireless Big Brother.*" Computers and Security. International Journal Devoted to the Study of Technical and Financial Aspects of Computer Security, Elsevier Science Publishers, vol. 19, No. 8, Dec. 1, 2000, pp. 667-668. Amsterdam, NL.

Rhodes, Bradley J. "*The Wearable Remembrance Agent: a System for Augmented Memory.*" Wearable Computers, 1997. Digest of Papers. First International Symposium on Cambridge, MA, USA, pp. 123-128.

Patent Cooperation Treaty (PCT) International Search Report, for International Application No. PCT/GB 02/02051, Search completed on May 9, 2003.

Mueller, Erik T., A Calendar with Common Sense, © 2000 ACM, pp. 198-201.

Schwartz, Ephraim, "Cellular Phone Giants to Integrate Sirf's GPS Technology", Aug. 10, 1998 [online], Retrieved from the Internet <URL: www.infoworld.com./cgi-bin/displayStory.pl?980810.ehe911.htm>.

"allNetDevices:—The Wireless Internet: Applications, Technology and Market Strategies", Jan. 10, 2001, pp. 1-4 [online]. Retrieved from the Internet <URL: www.allnetdevices.com/icom_cgi/print/print.cgi?url=http://www.allnetdevices.com/wireless/opinions/2001 . . . >.

"allNet Devices:—Java 2 Micro Edition and the Mobile Information Device Profile", Feb. 16, 2001, pp. 1-7 [online]. Retrieved from the Internet <URL: www.allnetdevices.com/icom_cgi/print/print.cgi?url=http://www.allnetdevices.com/developer/tutorials/2001 . . . >.

Software Patent Institute Database of Software Technologies, Record Display, Record 4, Serial No. TDB1192.0038. Retrieved from the Internet <URL: http://m.spi.org/cgi-bin/newqry?ISA=Hit . . . 000&rec=4&submit=seeit&csum=17256401631>, Nov. 1992.

Software Patent Institute Database of Software Technologies, Record Display, Record 6, Serial No. TDB1192.0045. Retrieved from the Internet <URL: http://m.spi.org/cgi-bin/newqry?ISA=Hit . . . 000&rec=4&submit=seeit&csum=17950330939>, Nov. 1992.

"allNetDevices:—Wearable Transmeta Device Planned", Nov. 14, 2000 [online]. Retrieved from the Internet <URL: www.allnetdevices.com/icom_cgi/print/print.cgi?url=http://www.allnetdevices.com/wireless/news/2001 . . . >.

"allNetDevices:—Any Content, Any Device, Anyplace", Feb. 16, 2001 [online]. Retrieved from the Internet <URL: www.allnetdevices.com/icom_cgi/print/print.cgi?url=http://www.allnetdevices.com/wireless/news/2001 . . . >.

* cited by examiner

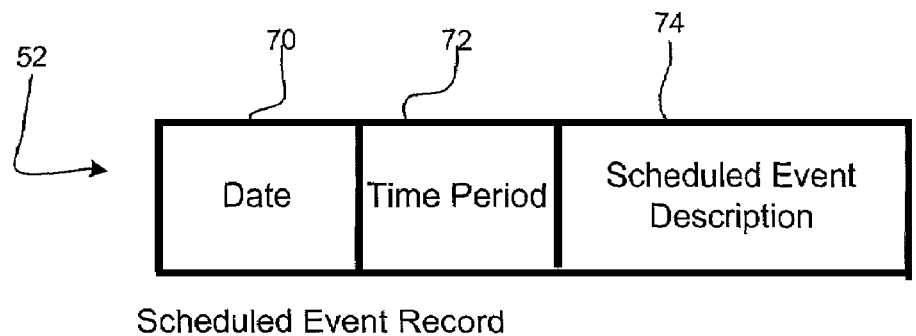
FIG. 3a  Scheduled Event Record
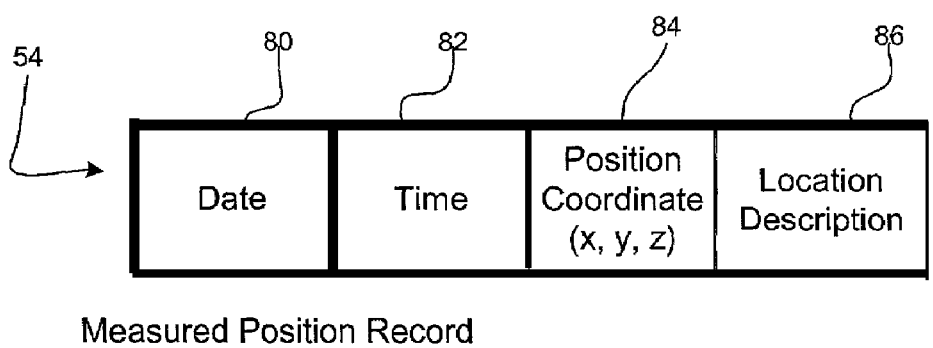
FIG. 3b  Measured Position Record
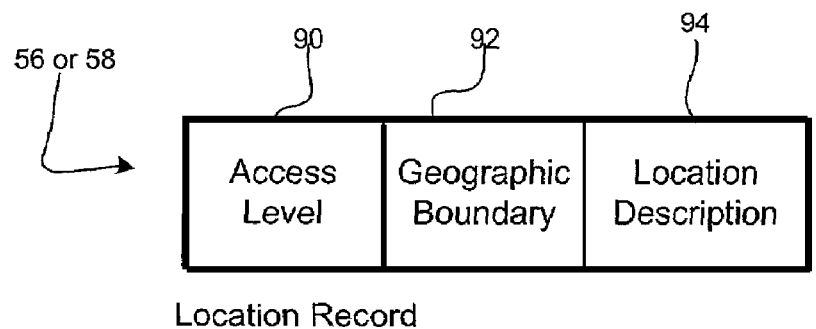
FIG. 3c  Location Record
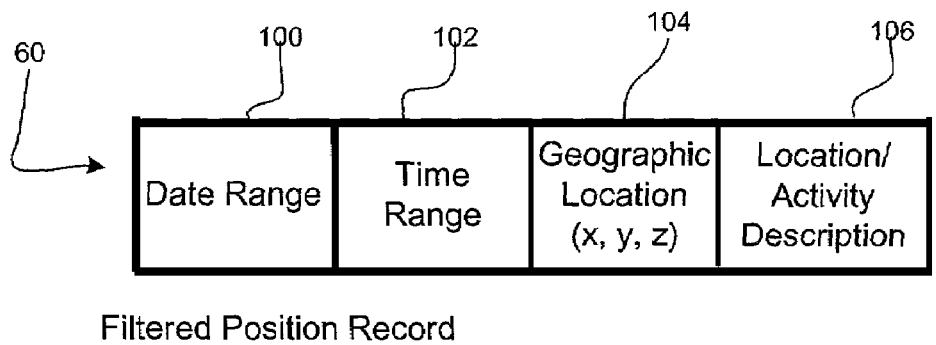
FIG. 3d  Filtered Position Record

FIG. 8

| Calendar | February 5, 2001 | | |
|---|---|---|---|
| Monday, February 5th | | | |
| Time | Scheduled Event | Actual Activity | |
| 8:00 AM | Arrive at Work | At Home | |
| 9:00 | Work at desk | In office | |
| 10:00 | | | |
| 11:00 | | | |
| 12:00 | Lunch at Dennys | In office | |
| 1:00 | Meeting w/ office team | In meeting room | |
| 2:00 | | In office | |
| 3:00 | | In office | |
| 4:00 | | In office | |
| 5:00 | Family Dinner | In office | |

May 2001
S M T W T F S
      1  2  3  4  5
6  7  8  9 10 11 12
13 14 15 16 17 18 19
20 21 22 23 24 25 26
27 28 29 30 31

March 2001
S M T W T F S
               1  2
3  4  5  6  7  8  9
10 11 12 13 14 15 16
17 18 19 20 21 22 23
24 25 26 27 29 30 31

Bid Submittal for Plumibing Services — 576

Enter Bid to Fix Sink for One Time — 570

Monday, February 5th

| Time | Bids Submitted |
|---|---|
| 8:00 AM | BUSY |
| 9:00 | BUSY |
| 10:00 | $79 $75 |
| 11:00 | |
| 12:00 | BUSY |
| 1:00 | |
| 2:00 | $93 $88 |
| 3:00 | |
| 4:00 | $77 |
| 5:00 | BUSY |

578

<Previous Day — 572
Next Day> — 574

Bid Submittal

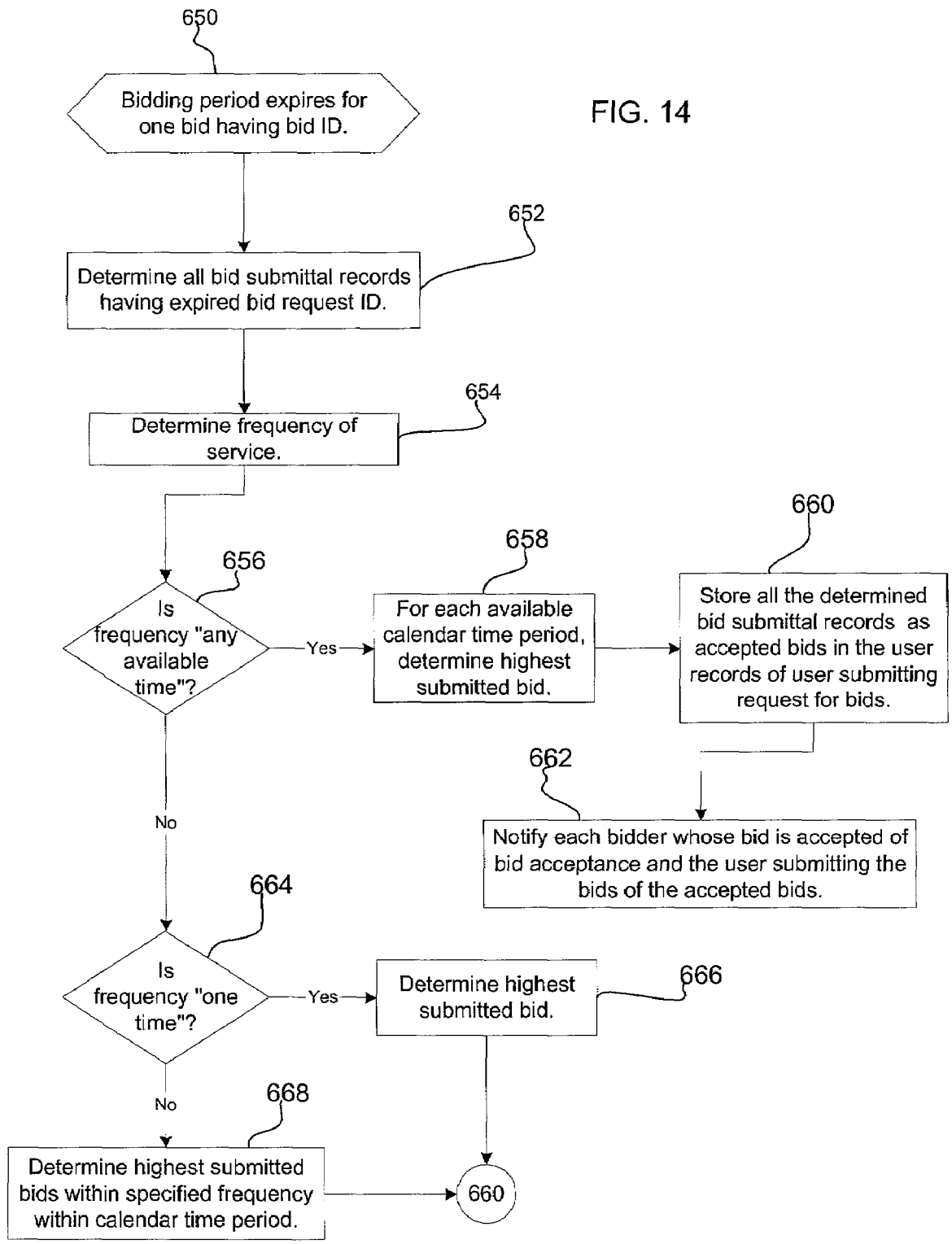

METHOD, SYSTEM, AND PROGRAM FOR IMPLEMENTING AN AUCTION USING CALENDAR INFORMATION

BACKGROUND OF THE INVENTION

1. Field of the Invention

The present invention relates to a method, system, and program for implementing an auction using calendar information.

2. Description of the Related Art

Much has been written about Internet auctions, where interested buyers submit bids to purchase products over the Internet. One of the more successful and profitable Internet companies is Ebay, Inc., which allows sellers to auction goods and products by requesting that buyers submit bids for their goods and products. Interested buyers may then submit bids to purchase the auctioned product. Internet sites also allow for reverse auctions where interested buyers of a product can request that sellers of the product submit bids over the Internet to sell the desired product.

Although the use of the Internet to auction goods and products is well established, less established is the auctioning of services that are purchased for specific time slots. For instance, a person may want to purchase a professional service for one or more calendar time slots. Alternatively, professionals may want to auction their services for available time slots. In enabling the auctioning of services, the time availability of the person requesting bids for the service must be taken into account as the service cannot be offered or provided for times when the bid requestor is unavailable.

Thus, there is a need in the art for a system that enables the auctioning of services for calendar time slots so as to ensure that bids are submitted for those times that the bid requester is available to receive or offer the service.

SUMMARY OF THE PREFERRED EMBODIMENTS

Provided is a method, system, and program for implementing an auction. Scheduled event records for a user are maintained within a computer database, wherein each scheduled event record indicates a scheduled event for the user at a calendar time slot. A request is received for bids for a service from the user indicating a time period, wherein the service is to be performed during a calendar time slot within the indicated time period. A determination is made of scheduled event records for the user within the indicated time period. A template is generated to display a calendar for the indicated time period showing time slots. Available time slots comprise time slots in the indicated time period that do not include one scheduled event as indicated in the scheduled event records. At least one bid for the service is received for one available time slot in which the service is to be performed, wherein the bid indicates an amount.

In further implementations, in response to an expiration of the bidding period, a determination is made of at least one bid having a most favorable amount. The determined at least one bid is accepted.

Still further, the request for bids may further indicate a requested frequency indicating a number of multiple bids that will be accepted for the time period indicated in the bid. In such case, in response to an expiration of the bidding period, a determination is made of up to the indicated number of bids having amounts higher than the amounts for other bids.

In one implementation, the user is requesting service providers to bid to provide the service during at least one available time slot within the indicated time period.

In a further implementation, the user is a service provider requesting that clients bid for the user to provide the service during available time slots. In such case, in response to an expiration of the bidding period, a determination is made of one bid in each available time slot having the highest bid amount if there is at least one bid submitted for the time slot. Each bid having the highest bid amount in each available time slot is accepted.

The described implementations provide a technique for using a user's scheduled event records maintained in a personal information manager (PIM) calendar system with an auction system, such that the auction system only allows bids to be submitted for time slots that do not conflict with the user's already scheduled events recorded in the PIM system.

BRIEF DESCRIPTION OF THE DRAWINGS

Referring now to the drawings in which like reference numbers represents corresponding parts throughout:

FIGS. 3a, b, c, d illustrate data structures used in accordance with implementations of the present invention;

FIGS. 8, 9a, and 9b illustrate examples of a display of user calendar and generated location information in accordance with implementations of the present invention;

FIG. 14 illustrates logic to accept submitted bids in accordance with implementations of the invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
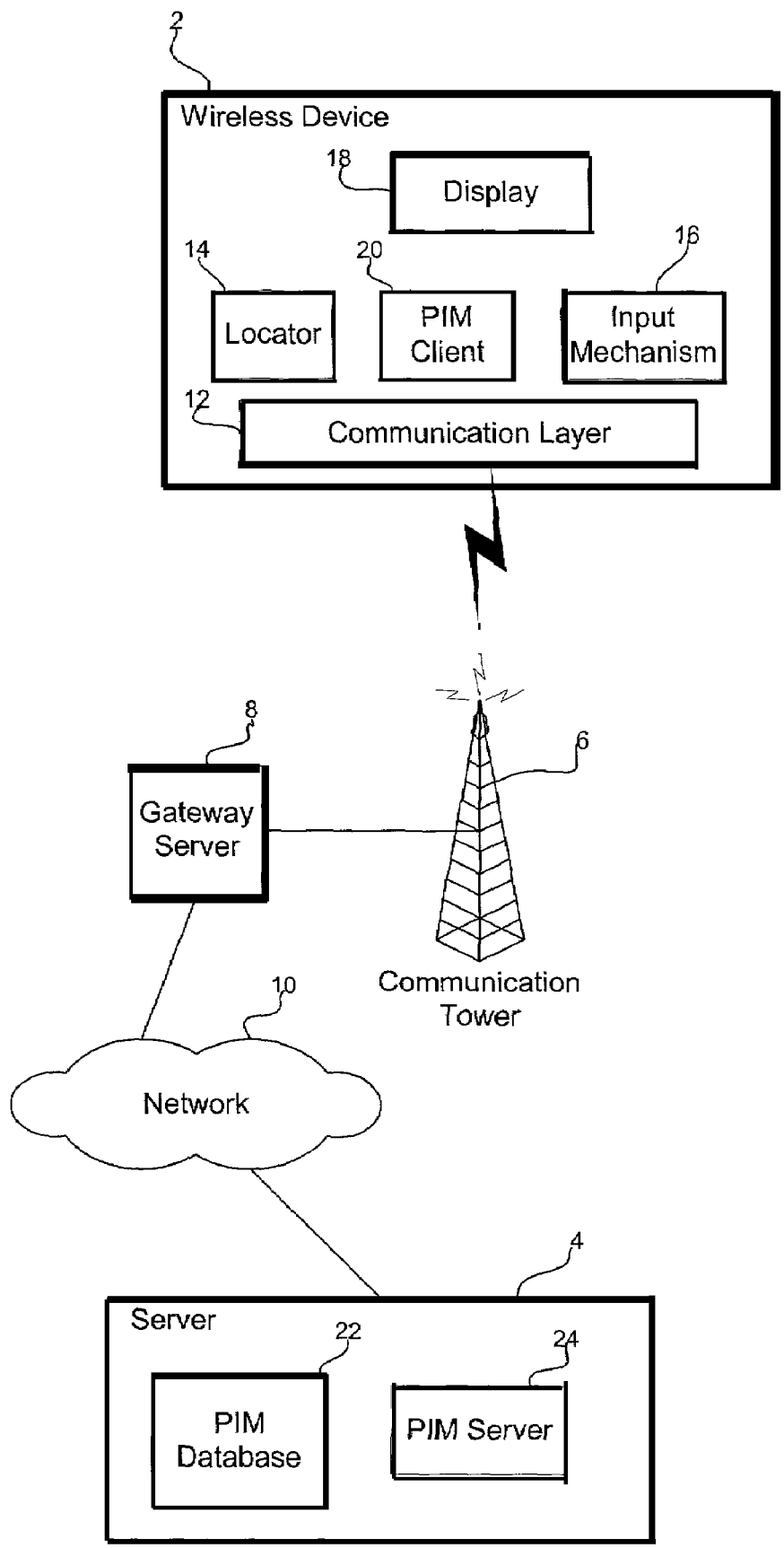
FIG. 1 illustrates a telecommunication environment in which aspects of the invention are implemented.

FIG. 1 illustrates a wireless computing environment in which embodiments of the invention are implemented. A wireless device 2, such as a telephony device, e.g., cellular phone, personal digital assistant (PDA), band held computer, palm computer, etc., communicates with a server 4 via a communication tower 6, gateway server 8, and network 10.

The server 4 may comprise one or more server class machines known in the art. The wireless device 2 includes a communication layer 12 which converts digital data into a signal that is transmitted to the communication tower 6 in a manner known in the art. The gateway server 8 converts the signals back into digital data to transmit via network 10 to the server 4. The network 10 may comprise any collection of devices, routers, etc. used to transmit data to a centralized server 4 providing data management for the wireless device 2 operations. The communication tower 6 and communication layer 12 may implement any known wireless transmission technology known in the art such as 3G, Code-Division Multiple Access (CDMA), Global System for Mobile Communications (GSM), satellite, Bluetooth, etc.**

**Bluetooth is a trademark of Telefonaktiebolaget LM Ericsson.

The wireless device 2 further includes locator technology 14 that provides a current position coordinate of the wireless device 2 in three dimensional space (x, y, z) on the surface of the earth and the time the position coordinate was generated. The locator 14 may comprise a global position satellite (GPS) receiver that is capable of calculating a current position based upon signals sent from satellites in a manner known in the art. Alternatively, the location of the wireless device 2 can be estimated externally from the wireless device by measuring the transmissions from the wireless device 2 using any known location positioning technology in a manner known in the art, such as Enhanced Observed Time Differential (E-OTD), Time Of Arrival (TOA), the CellPoint positioning system, the Ericsson Mobile Positioning System, etc.** In fact the U.S. Federal Communication Commission (FCC) mandated that cellular phone manufacturers incorporate technology to allow the location of the wireless device 2 to be determined. Any reference to the locator 14 refers to the locator technology used within the wireless device 2 that enables a position determination. For instance, if the locator 14 comprises a GPS receiver, then the locator 14 itself may determine the actual position coordinate. Alternatively, the locator 14 may provide information to an external component to enable the external component to determine the position coordinate of the wireless device 2.

**Bluetooth is a trademark of Telefonaktiebolaget LM Ericsson.

The wireless device 2 further includes an input mechanism 16 for entering any type of data, including text, voice data, audio, images, movies, etc. The input mechanism 16 may include any known data input system known in the art, including a keyboard embedded in the device 2 with depressable keys, a touch sensitive displayed keyboard, a microphone for providing audio input, voice recognition software, still image camera, video recorder, pen-stylus text input system including handwriting recognition software, etc. Data entered by the user through the input mechanism 16 or downloaded from the server 4 can be rendered in display 18, which may comprise any electronic display device known in the art. A Personal information Manager (PIM) client 20 gathers and presents PIM information, such as calendaring and scheduling information, in accordance with the described implementations. The term "PIM" as used herein refers to a program designed to allow users to organize random bits of information in a useful format. The PIM program may enable calendar or scheduler operations. A calendar program enables one or more users to record and organize events and appointments. A scheduler program enables a group of colleagues to schedule meetings and other appointments, and share schedule and calendar information. Further, the PIM may be intended for use by a single individual for personal information or for use by a company or organization to provide information related to that persons involvement with the company or organization. The use of the term PIM or PIM program herein refers to any program that includes some or all of the above described calendar or scheduler functions, or any other functions those skilled in the art associate with PIMs.

The server 4 includes a PIM database 22 maintaining user PIM information and a PIM server 24 for gathering and filtering data from wireless devices 2 for the users of the system. The PIM database 22 may be implemented using any database technology known in the art, e.g., relational database, object oriented database, etc. Although FIG. 1 only shows one wireless devices 2, the server 4 and PIM database 22 may maintain data for multiple wireless devices 2 and users.

In the described implementations, the PIM client 20 gathers position coordinates for the PIM server 24. The PIM server 24 then uses the position coordinates to supplement the user calendar records with information on what the user actually did for time periods within a day. The user could then view this enhanced calendar including listings of scheduled appointments as well as information describing the actual location and activities of the user and descriptions thereof. The term "location" and "geographic location" as used herein refer to any location that may be mapped and ascertained. Such location or geographic location may be any location on the surface of the earth or the earth's atmosphere, or outer space, that can be expressed as a position coordinate in space. The term "location" or "geographic location" may refer to a specific position coordinate in space, e.g., an X, Y, Z coordinate, or a boundary or area of coordinates. Additionally, the location may be expressed as a vector. The term "position coordinate" as used herein refers to any of a set of numbers used in specifying the location of a point in space, or any one of a set of variables used in specifying the state or motion of an entity, such as a wireless unit or person, associated with the position coordinate.

The PIM server 24 includes the program logic that responds to data requests from PIM clients 20, accesses the PIM database 22 to perform database operations, and performs other data management operations related to managing the PIM database 22. The PIM server 24 may include a database management system (DBMS) known in the art or include an interface to access a DBMS program in a manner known in the art to perform operations with respect to the PIM database 22. The PIM server 24 may implement any database programming techniques for performing operations in the PIM database 22. For instance, the PIM server 24 may implement separate application programs for performing database operations or implement database stored procedures to perform database operations. The PIM client 20 includes those program components that gather coordinate and location information as described herein, communicates with the PIM server 24, and renders calendaring information at the wireless device 2.

Figure 2:
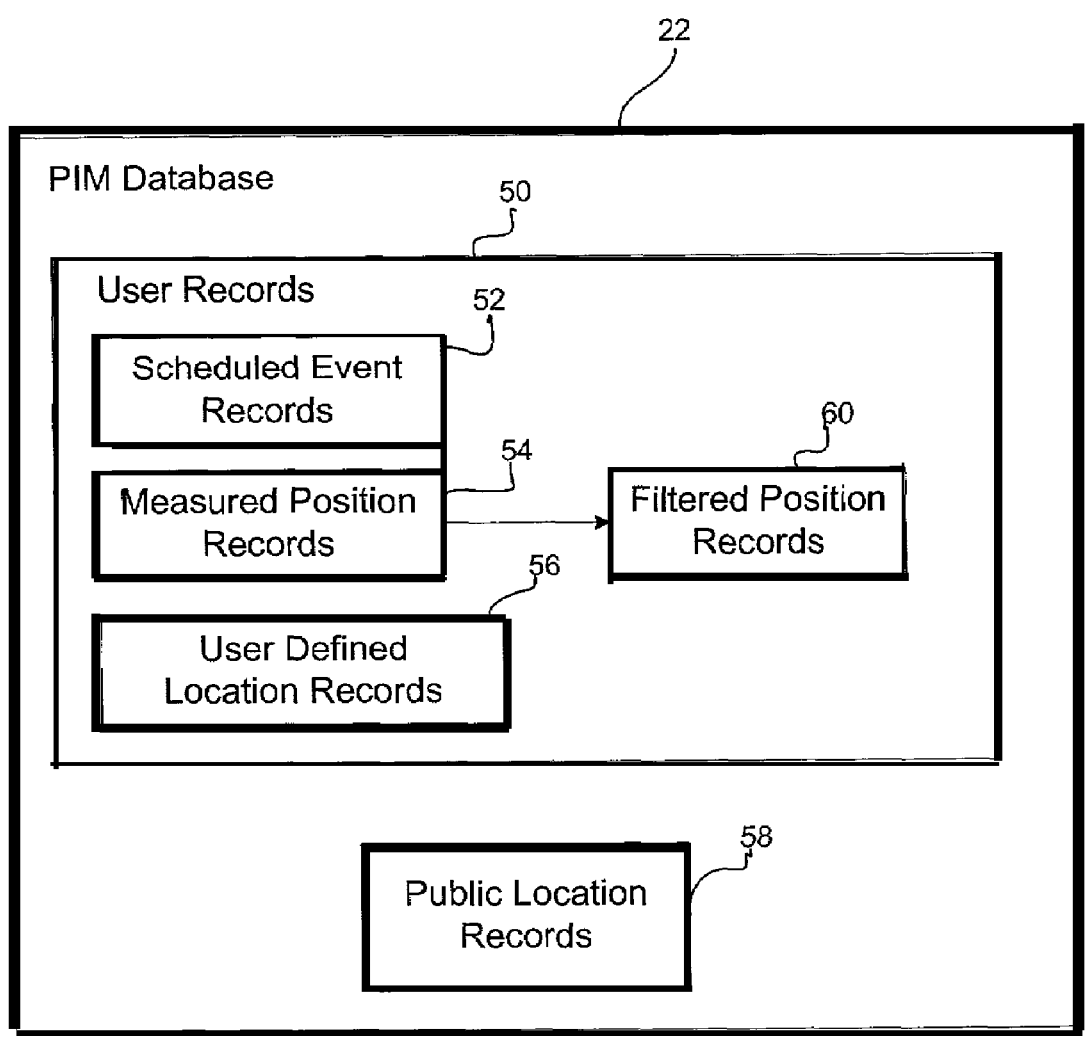
FIG. 2 illustrates components of a PIM database in accordance with implementations of the present invention.

FIG. 2 illustrates the data components of the PIM database 22 maintained by the server 4. The PIM database 22 includes a plurality of user records 50 for each user of a wireless device 2 participating in the wireless computing environment described herein. Each user record 50 includes one or more user scheduled event records 52, measured position records 54, and location records 56 and 58. From the measured position records 54, the PIM server 24 generates filtered position records 60 that provide information on user geographic location and activity for time periods, such as information for a period of fifteen minutes, twenty minutes, one hour, etc.

FIG. 3a illustrates fields in a user scheduled event record 52, including a date 70, time period 72 indicating a time range of the event, and a scheduled event description 74 providing information on the nature of the scheduled event. Through the client PIM 20 software, a user could use the input mechanism 16 to schedule a calendar event and create a scheduled event record 52. Additionally, the user could enter scheduled events from a desktop computer (not shown) that communicates with the server 4 via a network such as the Internet. The scheduled events may be shown in a calendar rendered on the display 18. Additionally, the scheduled events may be shown in a calendar rendered on another computer capable of accessing the server user records 50 in the server 4, such as a desktop computer communicating with the server 4 over the Internet.

FIG. 3b illustrates fields in a measured positioned record 54 for a user, including a date 80 and time 82 the position was measured, a position coordinate 84 expressed as a unique three dimensional x, y, z geographic coordinate on the surface of the earth, and a location description 86 providing descriptive information on the location. In the described implementations, the PIM client 20 periodically generates a measured position record 54 by obtaining the measured position coordinate (x, y, z) and the current time from the locator 14 (which may, in certain implementation interact with external components to provide the location and position coordinate). The location description 86 may be obtained locally at the wireless device 2 or determined subsequently by the server 4 as described in the following implementations.

FIG. 3c illustrates the fields maintained in the user defined 56 and public 58 location records. An access level field 90 indicates which users can be allowed to use the location record 56 or 58 to determine information about a location. The public location record 58 has public level access such that the PIM server 24 can consider a public location record 58 for any user in the PIM database 22. A user location record 56 can only be considered for the particular user that defined the location record 58 and any other authorized users in the system, as indicated by the access level 90. A geographic boundary field 92 defines a boundary of a defined region in three dimensional space. A location description field 94 provides a description of the location, which may include text, images, sound, movies, etc. A company maintaining the server 4, such as a telecommunication service provider, can use satellite maps and other information to determine the geographic boundaries in three dimensional space of various buildings and businesses. Business could register their geographic boundaries. Public location records 58 may then be generated for each of these determined geographic boundaries and include a description of the location within the geographic boundary.

The user specified location records 56 are generated by the user to provide information to include with the user's calendar. For instance, the user may obtain from a third party, such as a mapping company or organization, the geographic boundaries of an office or building and provide geographic boundary and location description information to the server 4 to include in a user location record 56. In another implementation, the user can activate a geographic boundary definition mode on the wireless device 2 to record position coordinates of a geographic boundary using the locator 14. In this geographic boundary definition mode, the user may walk or otherwise travel around a geographic area. While moving through the geographic area, the wireless device 2 would determine the x, y, z position coordinates at frequent intervals using the locator 14. The PIM client 20 or PIM server 24 can then use the determined position coordinates to determine a geographic boundary bounding all of the coordinates generated in the geographic boundary definition mode. This determined geographic boundary would then be included in the geographic boundary field 92 of the eventual user defined location record 56 stored in the user records 50 in the database 22. The user may further use the input mechanism 16 to enter information to include in the location description field 94 and the access level 90. The user access level 90 may specify that the user location record 68 be accessible to the user and other specified users, thereby limiting access of the location record 56 to a user defined group.

FIG. 3d illustrates a filtered position record 60 generated from a range of consecutive position records 54 having a same location description 86. The date range 100 and time range 102 for the generated filtered position record 60 would comprise the first and last dates 80 and times 82 of the consecutive position records 64 having the same location description 86. In this way, a single filtered position record 60 represents the data in multiple consecutive position records 54 having a same location description 106. Alternatively, a filtered position record 60 can consolidate multiple position records 54 that have position coordinates 84 within a predetermined proximity, without consideration of the location description 86. A geographic location field 104 indicates the common geographic location of the position records 60 having the same location description 86, which could include the geographic boundary from a location record 56 or 58 if the location description 86 of the consolidated position records 60 was determined from a location record 56 or 58.

Additionally, if algorithms in the PIM server 24 determine that a range of measured position records 54 define an activity, e.g., driving, walking, flying in an airplane, etc., then a filtered position record 60 would be generated for those position records 54 defining the activity. The date range 100 and time range 102 for the generated filtered position record 60 would comprise the first and last date 80 and time 82 of the consecutive position records 64 defining an activity and the location/activity description 106 field for this filtered position record 60 would include a description of the determined activity.

Figure 4:
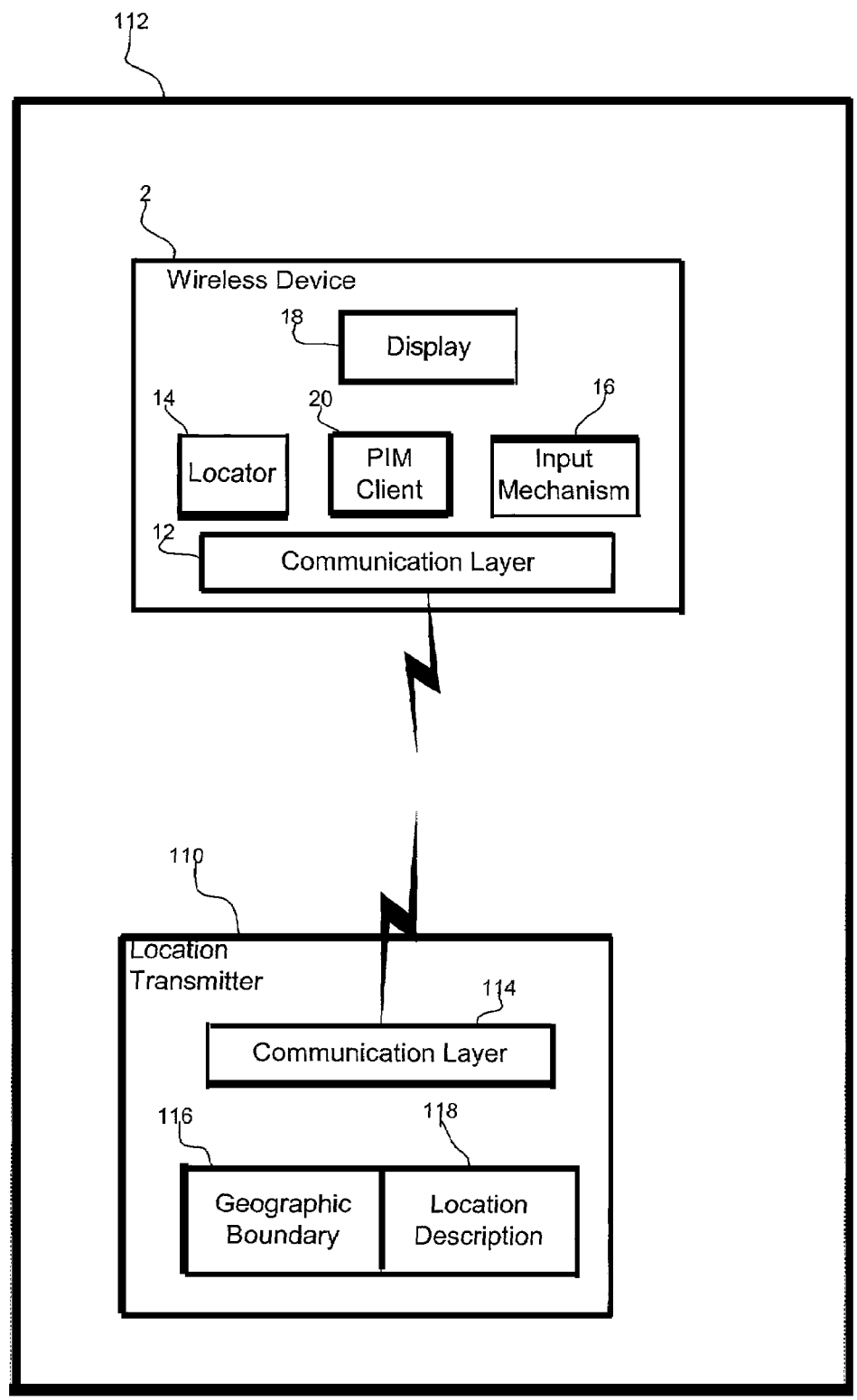
FIG. 4 illustrates further details of the telecommunication environment in which aspects of the invention are implemented.

FIG. 4 illustrates an additional implementation of the telecommunication environment for obtaining geographic boundary information. A location transmitter 110 is maintained in a geographic location or boundary 112, such as an office, building, designated region, etc., and includes a communication layer 114 to transmit data throughout the geographic location 112. For larger geographic locations, multiple location transmitters 110 may be deployed to transmit throughout the entire geographic location 112. The location transmitter 110 maintains a geographical boundary 116, defining a region of x, y, z coordinates, and a location description 118 providing descriptive information on the geographic boundary 112. The local transmitter 110 is capable of transmitting the geographic boundary 116 and location description 118 through the communication layer 114 to any receiving device within the geographic boundary 102. For instance, the communication layers 12 and 114 of the wireless device 2 and location transmitter 110, respectively, may implement Bluetooth technology. In such Bluetooth implementations, the location transmitter 110 may continually transmit packets containing an Inquiry Access Code (IAC) to establish communication with any wireless devices 2 within the geographic boundary 112. The wireless device 2 may then respond to establish a connection with the local transmitter 110. Upon establishing the connection, the local transmitter 110 may then transmit the geographic boundary 116 and location description 118 through communication layer 114 to the communication layer 12 of the wireless device 2. Further details of Bluetooth communication technology are described in the publication "Bluetooth™: Connect Without Cables" by Jennifer Bray and Charles F. Sturman (Copyright 2001, Prentice Hall), which publication is incorporated herein by reference in its entirety. In alternative implementations, the communication layers 12 and 114 may utilize wireless communication protocols other than Bluetooth known in the art to perform the communication operations described herein, such as the wireless LAN architecture standard proposed in IEEE 802.11.

Figure 5:
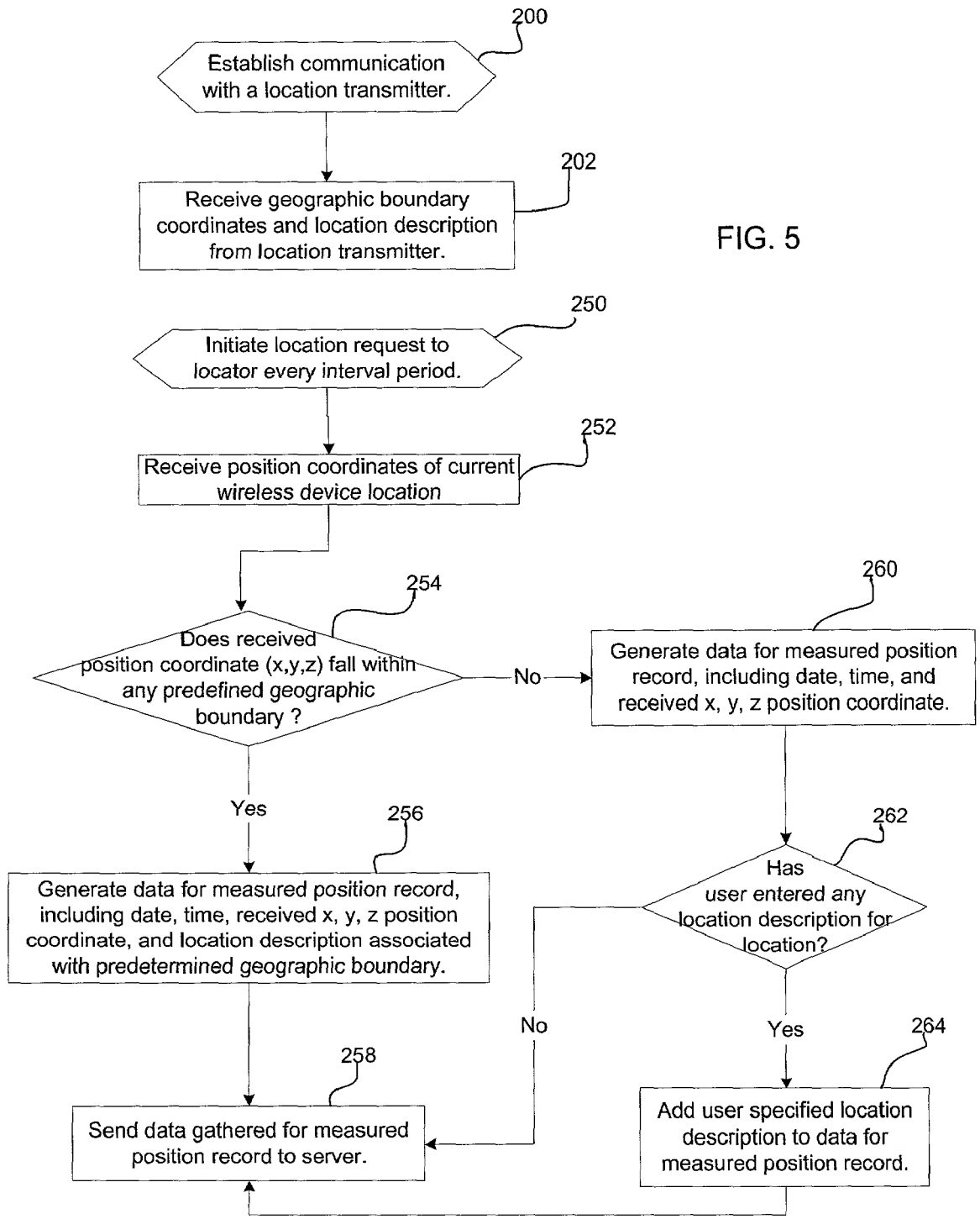
FIGS. 5, 6, and 7 illustrate flowcharts of code logic to gather, process, and use location information in accordance with implementations of the present invention.
Figure 6:
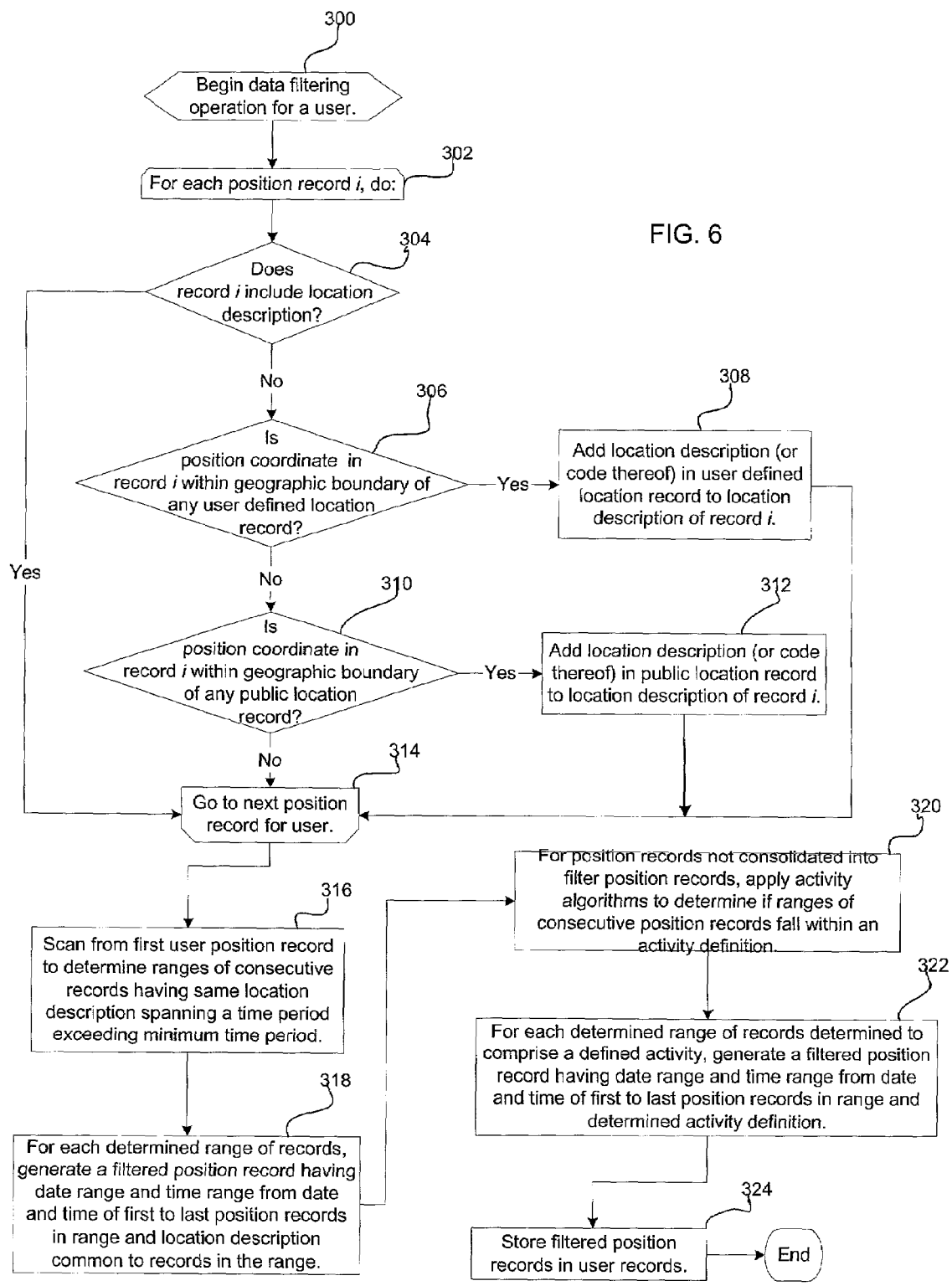
Figure 7:
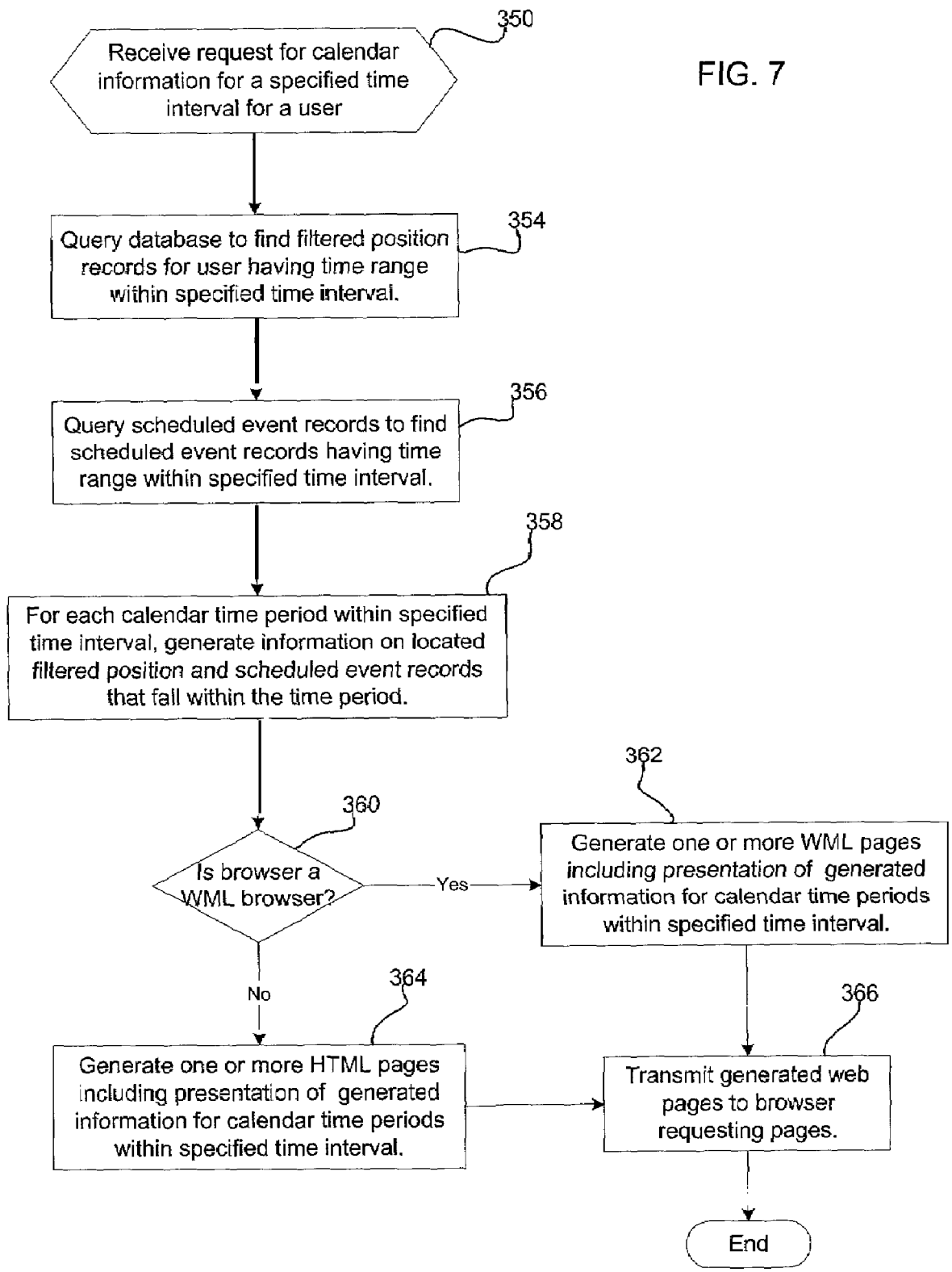

FIGS. 5-7 illustrate logic implemented in the PIM client 20 and server 24 to gather and utilize position information concerning the wireless device 2. FIG. 5 illustrates logic implemented in the PIM client 20 to gather position information to provide to the PIM server 24 to include within measured position records 54 in the database 22. At block 200, the wireless device 2 establishes communication with a location transmitter 110, using the Bluetooth technology or other wireless technology known in the art. After establishing a connection with the location transmitter 110, the PIM client receives (at block 202) a geographic boundary 116 comprised of X, Y, Z coordinates defining a three dimensional boundary on earth and location information describing the geographic boundary 116.

To provide data to the PIM server 24, the PIM client 20 performs steps 250 through 264 in interval time periods, e.g., every few seconds, minute, etc., to measure the current location and generate measured position records 54. At block 250, the PIM client 20 initiates a location request to the locator 14 or other unit to determine the current position coordinate (x, y, z) of the wireless device 2. Upon receiving (at block 252) the position coordinate from the locator 14, the PIM client 20 determines (at block 254) whether the received position coordinate falls within any predefined geographic boundaries supplied by a location transmitter 110, the PIM server 24, a user defined location record 56, or any other geographical boundary maintained by the PIM client 20. If so, the PIM client 20 generates (at block 256) data for a measured position record 54, including the received position coordinate, the date and time the coordinate was determined, and any location description associated with the predefined geographic boundary including the received position coordinate. The gathered data is then sent (at block 258) to the PIM server 24 to include as a position record 54 in the user records 50.

If (at block 254) the received position coordinate did not fall within any predefined geographic boundary, then the PIM client 20 generates (at block 260) data for a measured position record 54 including the received X, Y, Z position coordinate and the date and time the coordinate was measured. If (at block 262) the user has entered through the input mechanism 16 any location description for the current location through the input mechanism 16, then the PIM client 20 adds (at block 264) the user specified location description to the data for the measured position record. From block 264 or the no branch of block 262, the PIM client 20 transmits the data for the measured position record 54 to the PIM server 24 to include in the user records 50.

FIG. 5 provides logic implemented in the PIM client 20 to gather the position records for each measured coordinate. FIG. 6 illustrates logic for a filtering algorithm that consolidates and interprets the measured position records 54 and generates filtered position records 60 that provide information on the user's whereabouts and activities for time periods. The filtering algorithms used to generate the filtered position records 60 may be implemented in either the PIM client 20 or PIM server 24. In the event that the PIM client 20 executes the filtering algorithms, then the PIM client 20 would transmit the filtered position records 60 to the PIM server 54 to store in the PIM database 22.

With respect to FIG. 6, control begins at block 300 with the invocation of the filtering algorithm for the user records 50 of a particular user. A loop is performed from blocks 302 to 314 for each measured position record i in the user records 50 that has not yet been subject to filtering to add location description information 86 to the measured position record 64 if such data was not provided by the PIM client 20. If (at block 304) the measured position record i does not include any location description 86 data, then a determination is made (at block 306) as to whether the position coordinate 84 data in record i is within the geographic boundary of any user defined location records 56 of the user being considered. If so, then the location description 94 for the user defined location record 90 is added (at block 308) to the location description 86 data for the measured position record 64. If (at block 306) a geographic boundary was not located in the user defined location records 56, then a determination is made (at block 310) whether the position coordinate 84 data in record i is within the geographic boundary of any public location records 58. If so, then the location description 94 for the public location record 58 is added (at block 312) to the location description 86 data for the measured position record 64. From the yes branch of block 304 (if there is already location information added by the PIM client 20) or from blocks 308 or 312, control proceeds to block 314 to consider all the measured position records 54 for the user.

After the measured position records 64 are supplemented with location information from user defined 56 or public 58 location records, then control proceeds to blocks 316 to generate the filtered position records 60 that are particularly suited for use in a PIM or calendaring program. At block 316, the filter scans from the first user position record 54 to determine ranges of consecutive position records 54 having the same location description 86 spanning a time period exceeding a minimum time period. Thus, the filter is looking for position records indicating that the user was at a same location for a minimum time. The minimum time may be a time period of sufficient length that would be meaningful to display in a PIM interface, such as a calendar or schedule, e.g., 10 minutes, etc. For each determined range of records, a filtered position record 60 is generated (at block 318) having a date 100 and time 102 ranges from the date and time of the first to last position records in the determined range and having a location description 106 that is the common location description 86 found in the position records 54 in the determined range. In this way, a single filter position record 50 is generated that defines a location position that was maintained for a minimum time.

At block 320, activity algorithms may then be applied to those position records not consolidated into filtered position records 58 at block 316 and 318. An activity algorithm would analyze a series of consecutive measured position records and based on a rate of change in distance per unit of time, determine a predefined activity associated with the position records. For instance, a range of consecutive measured position records 54 whose position coordinate 84 (x, y, z) is rapidly changing may indicate that the user is traveling in an automobile or other transportation vehicle. Other rate of changes may indicate other activities, e.g., walking, running, bicycle riding, etc. For each determined range of measured position records 54 that define an activity, a filtered position record 60 is generated (at block 322) having a date 100 and time 102 ranges from the date 80 and time 82 of the first and last measured position records 54 in the range and an activity description field 106 set to the activity determined for the range. The geographic location field 104 may comprise a range of first and last locations for the activity, wherein the first location would comprise the location 84 data from the first measured position record 64 in the range for the activity and the last location would comprise the location data 84 from the last record 84 in the range. Thus, in certain described implementations, a filtered position record 60 indicates a time period during which a user was at a location, defined by a geographic boundary or a time period during which the user was engaged in an activity involving movement from one location to another.

The filtered position records 60 are then stored (at block 324) in the PIM database 22 for later use. The filtered position records 60 provide more useful descriptive information than the measured position records 54 because they indicate time periods spent at meaningful geographic locations or engagement in a particular activity.

FIG. 7 illustrates logic implemented in the PIM server 24 to generate calendar information that can be displayed at the wireless device 2 or some other computer in communication with the server 4, such as a desktop computer accessing the server 4 over the Internet. Control begins at block 350 with a request for PIM information for a time interval for a user. In response, the PIM server 24 queries the PIM database 22 for filtered position records 60 (at block 354) and scheduled event records 52 (at block 356) of the user within the specified time interval. The PIM server 24 then generates (at block 358) for each calendar time period, e.g., every half-hour, hour, etc., information on the scheduled event description 74 and the location/activity description 106 (FIGS. 3a, d) in the located scheduled event 52 and filtered position 58 records, respectively, that fall within the calendar time periods that span the specified time interval.

If (at block 360) the viewer program requesting the calendar information for the time period is a WML browser on a small device, e.g., the wireless device 2, then the PIM server 24 generates (at block 362) one or more WML pages including a presentation of the information generated for each calendar time period in the user specified time interval including information on user scheduled events and actual location/activity. Otherwise, if the viewer or browser requesting the calendar information includes a larger display area, then the PIM server 24 generates (at block 364) one or more HTML pages including the presentation of the generated calendar information. From blocks 362 or 364, control transfers to block 366 to transmit the generated web pages to the browser requesting that page. Alternatively, the PIM server 24 may include the generated calendar information in an Extensible Markup Language (XML) or other file that is sent to the PIM client 20 to render on the local display. Thus, the calendar information presented to the user may include a description of user scheduled events as well as information on the geographical locations the user associated with the wireless device 2 visited during the specified time interval.

FIG. 8 illustrates an example of calendar information for the user specified time period presented in a calendar window 400 rendered on a computer display monitor. As shown, the calendar displays both user scheduled events 402 from the scheduled event records and actual location/activity 404 from the filtered position records for calendar times 406 during the specified time interval. In this way, the user may compare what was scheduled with what actually materialized. Moreover, in implementations where the PIM server 24 updates the user calendar information in real time and generates real time filtered position records, the calendar 400 could display the user's current geographical location. This information could be useful for business associates and others interested in the user's location. Additionally, the actual location/activity 402 may be displayed in an abbreviated format. The user may use an input device to selectively display further details on the actual location/activity. For instance, the user may move a mouse input device over the displayed abbreviation of the actual location/activity or click the displayed abbreviation to cause the display of more detailed information on the actual location/activity in the calendar window 400.

Figures 9A, 9B:
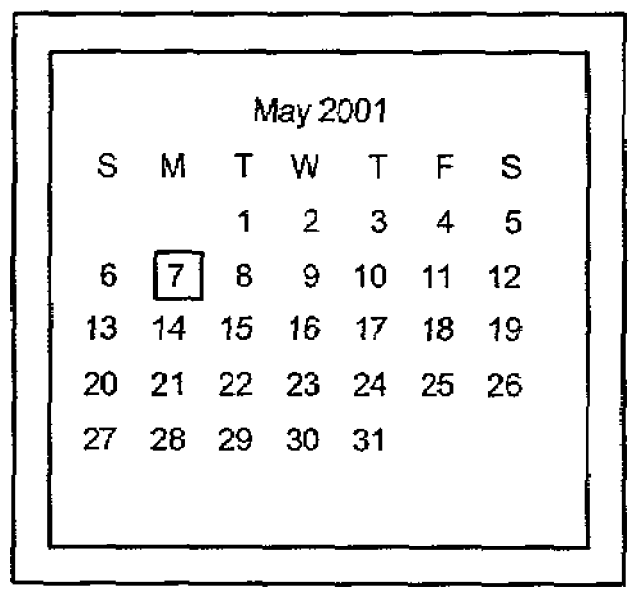

FIGS. 9a, b illustrate how calendar information may be displayed on a display 18 of a wireless device 2 having limited display space. FIG. 9a illustrates a small displayed monthly calendar. Upon user selection through the input mechanism 18 of a particular day, e.g., February $5^{th}$, the PIM client 20 displays the view shown in FIG. 9b which provides information of scheduled events 450 and actual user location/activity 452 for a portion of the calendar times 454 during the user requested time interval. The user can use the input mechanism 18 to scroll downward to view further calendar entries.

The described implementations provide a technique for gathering and utilizing user position information for use with a PIM or calendaring program. This position information may be provided to the user and those authorized by the user to track actual activity versus scheduled activity.

Using the PIM System to Implement an Auction for Services

In an additional implementation, users may provide their calendar information, i.e., scheduled event records 52 (FIG. 3a) for use with a reverse auction program, implemented in the PIM server 24, that allows service providers to submit bids for a user requested service for a calendar time period. Additionally, professionals may make their calendar information available for a direct auction to allow clients/bidders to bid to purchase the professional's time for specific time periods.

Figure 10:
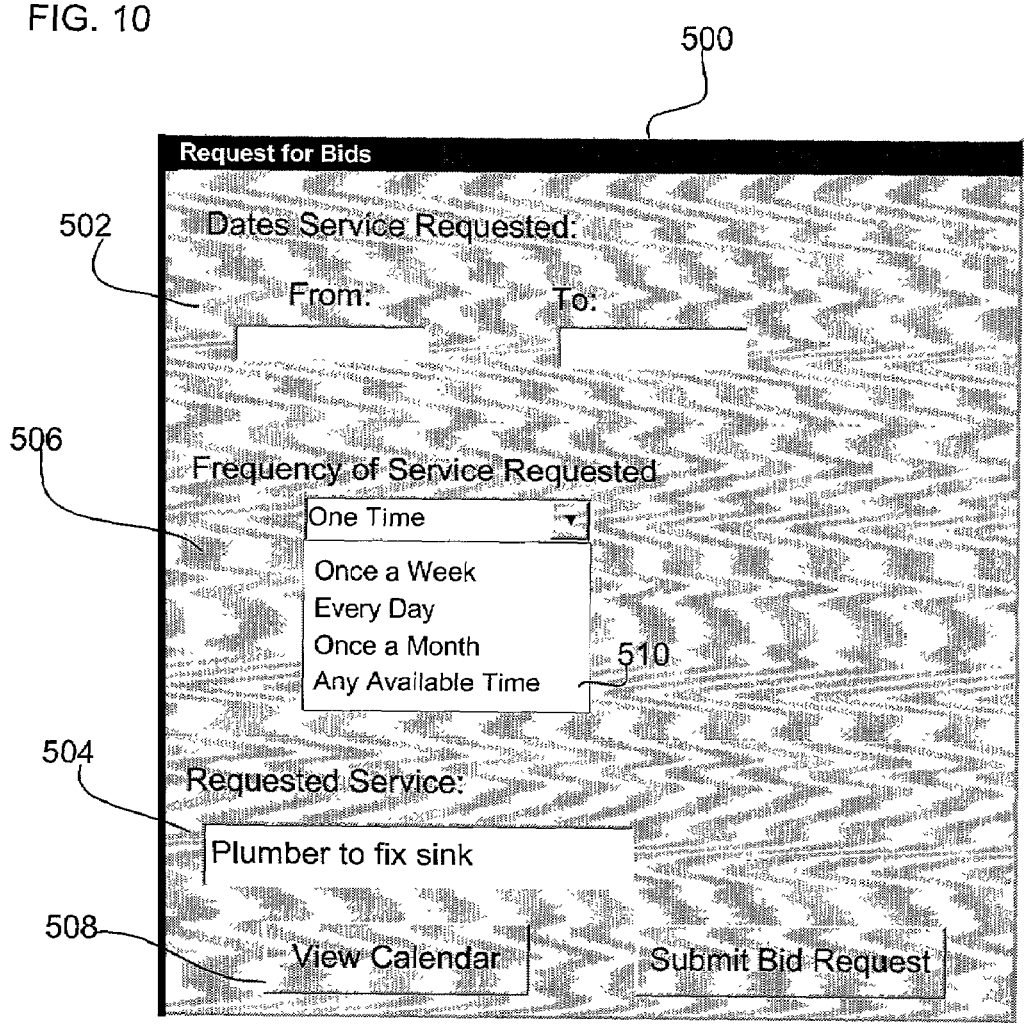
FIG. 10 illustrates a displayed template a user uses to submit a request for bids for a service in accordance with implementations of the invention.

FIG. 10 illustrates an implementation of a bid request form 500 that a user of the PIM system would use to enter the parameters to allow service providers to bid for a requested service as part of a reverse auction. The PIM server 24 may include a HyperText Markup Language (HIML) implementation of the bid request form 500 to transmit to users to allow users to provide the PIM server 24 with information to implement a reverse auction. The user may specify a time period 502 and a requested service 504 for the time period, as well as a frequency 506 that the user wants the service performed. The user may select the view calendar button 508 to display the schedule for the time period specified in field 502 and edit the displayed calendar time periods to block off further time slots to preclude bidding during such time slots or open other time slots for bids. Once the user has finalized the calendar submitted with the bid request, the user would submit the bid request parameters and the user calendar information for the period to the PIM server 24 to use to implement an auction and accept bids for the requested service.

Figure 11:
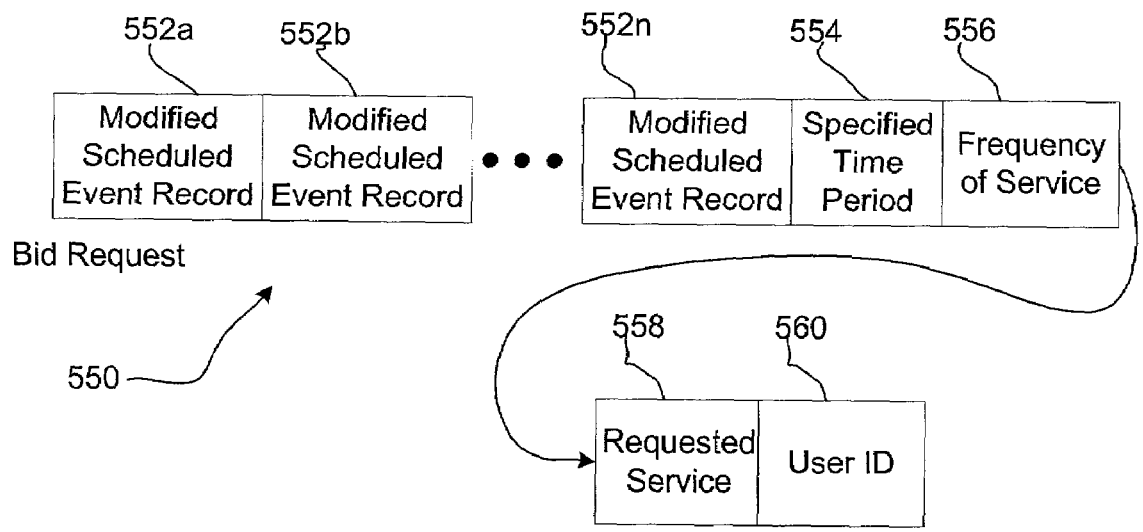
FIG. 11 illustrates a data structure for a bid request generated using the template illustrated in FIG. 10 in accordance with implementations of the invention.

FIG. 11 illustrates data in a bid request 550 data structure that the user would transmit to the PIM server 24 in response to selecting the "Submit Bid Request" button in the bid request form 500, including:

Modified scheduled event records 552a, b . . . n: Scheduled event records based on the user scheduled event records 52 for the specified time period in the time period field 502. Each modified scheduled event record includes a date, time period, and scheduled event description field indicating BUSY. In certain implementations, using the BUSY message for the event description prevents personal user calendar information in the scheduled event description 74 FIG. 3a) from being made available to bidders.

Specified Time Period 554: time range entered in field 502 of the bid request form 500. Bids may be submitted for the service for the specified time period.

Frequency of Service 556: frequency of the requested service as specified in field 506, which indicates the times the service is requested, e.g., once a week, once a month, every day, etc.

Requested Service 558: Service for which bids are requested as specified in field 504.

User ID 560: unique identifier of the user in the PIM database 22 that submitted the request for the bids for the specified service.

The PIM server 24 generates information from the submitted template 500 at a centralized electronic bulletin board that third parties may access to submit bids at calendar time periods. The electronic bulletin board may be accessible over the Internet or on a private network The PIM server 24 may display a summary of user bid request postings that the bidders may select and review.

Figures 12, 13:
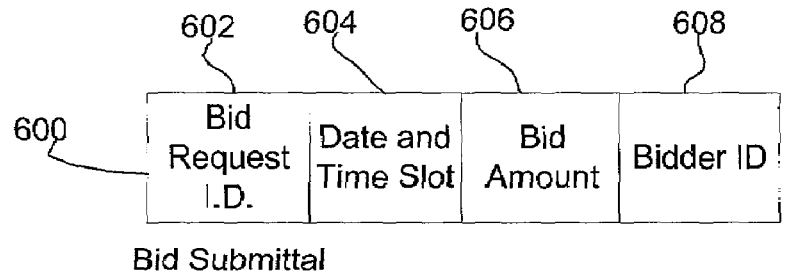
FIG. 12 illustrates a displayed template used to submit bids for the request for bids in accordance with implementations of the invention.
FIG. 13 illustrates a data structure for a submitted bid using the template illustrated in FIG. 12 in accordance with implementations of the invention.

FIG. 12 illustrates an example of a bid submittal form 570 the PIM server 24 would generate and provide to bidders to use to review the nature of the auction and submit bids. The bidders may access the bid submittal form through a web based interface, such as a HyperText Transfer Protocol (HTTP) server, using a web client, such as an Internet browser. The PIM server 24 would transmit an HTML page implementing the bid submittal form 570 to enable bidders to submit bids. The PIM server 24 may periodically refresh the bid submittal form 570 to update bid information. The bid submittal form 570 displays a calendar of time slots based on the modified scheduled event records 552a, b . . . n submitted by the user, such that a "BUSY" block is displayed for the time period specified in each modified scheduled event record 552a, b . . . n provided with the bid request 550. If the user specified that bids may be submitted across multiple days, then the HTML form implementing the bid submittal form 570 would display buttons 572 and 574 to allow the service provider to view calendar displays for further days or time slots that do not fit in the view. The HTML implementation of the bid submittal form 570 further displays information on the requested service and the frequency of the service requested 576. The bid submittal form 570 further displays a scroll bar 578 to allow the service provider to view additional time slots. As shown in FIG. 12, the bid submittal form displays bids submitted by different service providers for a specified time period. Note that multiple bids submitted for the requested service are displayed in the time slots. The service provider may enter a bid through the bid submittal form 570 by selecting a time slot in the HTML implementation of the bid submittal form displayed in the service provider's computer web browser. In response to selection of the time slot, the PIM server 24 would transmit a further HTML template to display a dialog box in which the bidder may enter the bid parameters and transmit such bid parameters back to the PIM server 24.

FIG. 13 illustrates an example of a bid submittal data structure 600 the PIM server 24 would generate in response to bid parameters the bidder would enter and transmit back to the PIM server 24. The bid submittal data structure 600 the PIM server 24 generates from the information provided by the bidder includes:

Bid Request ID 602: Unique identifier of the bid request submitted by the user and assigned to the bid request data 550 to associate a submitted bid with a bid request.

Date and Time Slot 604: indicates the date and time slot for which the bid is submitted.

Bid Amount 606: indicates the amount of the submitted bid

Bidder ID 608: comprises a unique ID of the person or entity submitting the bid, which may comprise a user ID in the PIM database 22 if the person submitting the bid has user records 50 in the PIM database 22.

The PIM server 24 would maintain the bid submittal records 600 for each bid request ID 602 to generate the display of the bid submittal form 570 including submitted bids. After the bidding period expires, which may comprise a default or user specified period of time for receiving bid requests, the entity submitting the highest bid is allowed to provide the service to the user requesting the bid. If the user requesting bids has indicated that they would like to purchase multiple instances of the service, i.e., the frequency of service is greater than one, then the highest submitted bids would be selected to provide instances of the requested service at the requested frequency level. For instance, if the user requested the service once a week during the time period, then the highest bid for time slots in each week in the time period would be selected.

The above implementation was for a reverse auction where service providers submitted bids to provide a service to the user based on the user's availability as determined by the scheduled event records 52 (FIG. 3a) in the user records 50 in the PIM database 22. In further implementations, the above described GUI panels and data structures may be used to allow a service provider to request bids to auction off their own time in a direct auction. For instance, the service provider may have available time slots in their calendar during which they can provide a service, e.g., legal consulting, financial consulting, physical therapy, psychological counseling, etc. The service provider would be a use of the PIM database having scheduled event records 52 defining their scheduled calendar events. The service provider would use the request for bids form 500 (FIG. 10) and select the "Any Available Time" value 510 as the frequency of service to allow others to bid for their time at any available time slot on the calendar during normal business hours. The requested service 504 would comprise the service the service provider offers. The service provider may then select the view calendar 508 button to further modify the available slots that will be displayed in the template 570 (FIG. 12).

Those interested in scheduling time with the service provider user of the database may use the bid submittal form 570 to submit a bid for a time slot to purchase the service provided. At the end of the bidding period, if there are multiple bids for a time slot, the person submitting the highest bid for a time slot is awarded the service at the requested time, which is the most favorable bid in the context of a direct auction. Moreover, the user submitting the bid request may request a minimum or maximum bid amount. For instance, in the case of the reverse auction requesting that service providers submit bids, the user may specify a maximum amount for any bid. Further, in the case of a direct auction requesting bids to purchase time from a service provider, the service provider may specify a minimum bid amount for the service.

FIG. 14 illustrates logic implemented in the PIM server 24 to determine those bids to accept for a bid request 550. Control begins at block 650 when the bidding period expires for one bid request 550 (FIG. 11). In response, the PIM server 22 determines all bid submittal records 600 (FIG. 13) having the expired bid request ID 602. The frequency of service 556 is determined (at block 654). If (at block 656) the requested frequency of service is "any available time", then for each available calendar time slot in the specified time range 554, the PIM server 24 determines (at block 658) the bid submittal records 600 having the highest bid amount 606. All the determined bid submittal records 600 are stored (at block 660) in the PIM database 22 as accepted bids in the user records 50 (FIG. 2) of the user submitting the bid request 550. The PIM server 24 further notifies (at block 662) each bidder whose bid is accepted of the bid acceptance and the user submitting the bid request 550 of the accepted bids. Those whose bids were not accepted may also be notified. The execution of the transfer may then be handled directly between the bidder and bid requester, and the exchange of payment may occur through a clearinghouse or through a direct transaction between the bidder and bid requester. The "any available time" frequency would be used by service providers to open their schedule to allow clients to bid for available time slots in a direct auction of their time. In certain implementations, those bidding would be capable of viewing all previously submitted bids in the bid submittal template 570 (FIG. 12)

If (at block 664) the frequency of service 556 (FIG. 11) is "one time", then the PIM server 24 determines the bid submittal record 600 having the most favorable bid amount 606 (which in reverse auctions is the lowest bid and in direct auctions is the highest bid) and proceeds to block 660 to store the determined highest bid and notify the bidder and bid requestor of the auction results. If the frequency of service 556 is some other value, e.g., once a week, every day, once a month, etc., then the PIM server 24 determines (at block 668) the highest submitted bids within the specified frequency within the calendar time period, highest submitted bid each day, once a week, once a month, etc., and proceeds to block 660 to complete the auction.

The described implementations provide a technique to integrate a user's calendar of scheduled events into a bid submittal request where the available time slots for which bids may be received are based on the available time between calendar scheduled events. In this way, the PIM calendar is extended to implement an auction where the PIM user can request bids for a service in a reverse auction or direct auction for the service.

Additional Implementation Details

The described aspects of the invention, including the logic described with respect to the PIM client and server and any other devices, may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which the invention is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, bids were submitted for services to be performed. Additionally, bids may be submitted for goods and products other than services to be delivered or received at available calendar time slots.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for implementing an auction, comprising:

maintaining scheduled event records for a user within a computer database, wherein each scheduled event record indicates a scheduled event for the user at a calendar time slot;

receiving a request for bids for a service from the user indicating a time period, wherein the service is to be performed during a calendar time slot within the indicated time period, wherein the user comprises one of a service provider seeking bidders to purchase services offered by the user and a service user seeking service providers to bid to offer their services;

determining scheduled event records for the user within the indicated time period;

generating a template to display a calendar for the indicated time period showing time slots, wherein an available time slot comprises a time range in the indicated time period that does not include one scheduled event as indicated in the scheduled event records; and receiving at least one bid for the service for one available time slot in which the service is to be performed, wherein the bid indicates an amount.

2. The method of claim 1, wherein multiple bids may be submitted for each available time slot.

3. The method of claim 1, further comprising:

in response to an expiration of the bidding period, determining at least one bid having a most favorable amount; and accepting the determined at least one bid.

4. The method of claim 3, wherein accepting the bid further comprises:

notifying the user submitting the request for bids and each originator of each determined bid of the bid acceptance; and storing information on the accepted bid with information on the received request in the computer database.

5. The method of claim 1, wherein the request for bids further indicates a requested frequency indicating a number of multiple bids that will be accepted for the time period indicated in the bid, further comprising:

in response to an expiration of the bidding period, determining up to the indicated number of bids having the most favorable amounts.

6. The method of claim 1, wherein the request for bids further indicates at least one time interval within the indicated time period during which one highest bid will be accepted, wherein one bid having the highest amount will be accepted within each time interval within the indicated time period.

7. The method of claim 6, wherein the time interval is capable of comprising a day, a week, and a month.

8. The method of claim 1, wherein the user is requesting service providers to bid to provide the service during at least one available time slot within the indicated time period, and wherein the most favorable bid comprises a lowest amount bid.

9. The method of claim 1, wherein the user is a service provider requesting that clients bid for the user to provide the service during available time slots, further comprising:

in response to an expiration of the bidding period, determining one bid in each of a plurality of available time slots having a highest bid amount for the available time slot if there is at least one bid submitted for the time slot; and accepting bids having the highest bid amounts in the available time slots.

10. The method of claim 1, wherein the user scheduled event records are used by a personal information manager (PIM) to provide calendaring information to the user independent of the use of the scheduled event records to generate the template indicating available time slots during for which bids may be submitted.

11. The method of claim 1, further comprising:

displaying a calendar indicating the scheduled event records within the time period indicated in the request for bids, wherein the calendar is capable of enabling the user to modify scheduled event records and add scheduled event records to further limit the available time slots for which bids can be submitted.

12. The method of claim 1, wherein the template displays the time slots indicated in the determined scheduled event records as unavailable.

13. The method of claim 12, wherein each scheduled event record further provides a description of the scheduled event, wherein the template displaying the time slots indicated in the determined scheduled event records as unavailable does not display the description of the scheduled event.

14. A personal information manager, comprising:

means for displaying scheduled events of a user for designated calendar time slots, wherein the user comprises one of a service provider seeking bidders to purchase services offered by the user and a service user seeking service providers to bid to offer their services;

means for displaying a bid form indicating a bid for a service to be performed at available time slots void of a scheduled event;

means for receiving input indicating at least one bid for the service to be performed at one available time slot; and means for submitting the bid form including the received input indicating at least one bid, over a network, for the service during one available time slot.

15. The personal information manager of claim 14, further comprising:

means for receiving and displaying information indicating acceptance of the submitted bid, wherein at least one submitted bid having a most favorable amount is accepted.

16. A system for implementing an auction, comprising:

a computer database;

means for maintaining scheduled event records for a user within the computer database, wherein each scheduled event record indicates a scheduled event for the user at a calendar time slot;

means for receiving a request for bids for a service from the user indicating a time period, wherein the service is to be performed during a calendar time slot within the indicated time period, wherein the user comprises one of a service provider seeking bidders to purchase services offered by the user and a service user seeking service providers to bid to offer their services;

means for determining scheduled event records for the user within the indicated time period;

means for generating a template to display a calendar for the indicated time period showing time slots, wherein an available time slot comprises a time range in the indicated time period that does not include one scheduled event as indicated in the scheduled event records; and means for receiving at least one bid for the service for one available time slot in which the service is to be performed, wherein the bid indicates an amount.

17. The system of claim 16, wherein multiple bids may be submitted for each available time slot.

18. The system of claim 16, further comprising:

means for determining at least one bid having a most favorable amount in response to an expiration of the bidding period; and means for accepting the determined at least one bid.

19. The system of claim 18, wherein the means for accepting the bid further performs:

notifying the user submitting the request for bids and each originator of each determined bid of the bid acceptance; and storing information on the accepted bid with information on the received request in the computer database.

20. The system of claim 16, wherein the request for bids further indicates a requested frequency indicating a number of multiple bids that will be accepted for the time period indicated in the bid, further comprising:

means for determining up to the indicated number of bids having the most favorable amounts in response to an expiration of the bidding period.

21. The system of claim 16, wherein the request for bids further indicates at least one time interval within the indicated time period during which one highest bid will be accepted, wherein one bid having the highest amount will be accepted within each time interval within the indicated time period.

22. The system of claim 21, wherein the time interval is capable of comprising a day, a week, and a month.

23. The system of claim 16, wherein the user is requesting service providers to bid to provide the service during at least one available time slot within the indicated time period, and wherein the most favorable bid comprises a lowest amount bid.

24. The system of claim 16, wherein the user is a service provider requesting that clients bid for the user to provide the service during available time slots, further comprising:

means for determining, in response to an expiration of the bidding period, one bid in each of a plurality of available time slots having a highest bid amount for the available time slot if there is at least one bid submitted for the time slot in response to an expiration of the bidding period; and means for accepting bids having the highest bid amounts in the available time slots.

25. The system of claim 16, wherein the user scheduled event records are used by a personal information manager (PIM) to provide calendaring information to the user independent of the use of the scheduled event records to generate the template indicating available time slots during for which bids may be submitted.

26. The system of claim 18, further comprising:

means for displaying a calendar indicating the scheduled event records within the time period indicated in the request for bids, wherein the calendar is capable of enabling the user to modify scheduled event records and add scheduled event records to further limit the available time slots for which bids can be submitted.

27. The system of claim 16, wherein the template displays the time slots indicated in the determined scheduled event records as unavailable.

28. The system of claim 27, wherein each scheduled event record further provides a description of the scheduled event, wherein the template displaying the time slots indicated in the determined scheduled event records as unavailable does not display the description of the scheduled event.

29. A computer readable medium comprising computer readable code that when executed implements an auction by performing operations, the operations comprising:

maintaining scheduled event records for a user within a computer database, wherein each scheduled event record indicates a scheduled event for the user at a calendar time slot;

receiving a request for bids for a service from the user indicating a time period, wherein the service is to be performed during a calendar time slot within the indicated time period, wherein the user comprises one of a service provider seeking bidders to purchase services offered by the user and a service user seeking service providers to bid to offer their services;

determining scheduled event records for the user within the indicated time period;

generating a template to display a calendar for the indicated time period showing time slots, wherein an available time slot comprises a time range in the indicated time period that does not include one scheduled event as indicated in the scheduled event records; and receiving at least one bid for the service for one available time slot in which the service is to be performed, wherein the bid indicates an amount.

30. The computer readable medium of claim 29, wherein multiple bids may be submitted for each available time slot.

31. The article of manufacture computer readable medium of claim 29, further comprising:

in response to an expiration of the bidding period, determining at least one bid having a most favorable amount; and accepting the determined at least one bid.

32. The computer readable medium of claim 31, wherein accepting the bid further comprises:

notifying the user submitting the request for bids and each originator of each determined bid of the bid acceptance; and storing information on the accepted bid with information on the received request in the computer database.

33. The computer readable medium of claim 31, wherein the request for bids further indicates a requested frequency indicating a number of multiple bids that will be accepted for the time period indicated in the bid, further comprising:

in response to an expiration of the bidding period, determining up to the indicated number of bids having the most favorable amounts.

34. The computer readable medium of claim 31, wherein the request for bids further indicates at least one time interval within the indicated time period during which one highest bid will be accepted, wherein one bid having the highest amount will be accepted within each time interval within the indicated time period.

35. The computer readable medium of claim 34, wherein the time interval is capable of comprising a day, a week, and a month.

36. The computer readable medium of claim 31, wherein the user is requesting service providers to bid to provide the service during at least one available time slot within the indicated time period, and wherein the most favorable bid comprises a lowest amount bid.

37. The computer readable medium of claim 31, wherein the user is a service provider requesting that clients bid for the user to provide the service during available time slots, further comprising:

in response to an expiration of the bidding period, determining one bid in each of a plurality of available time slots having a highest bid amount for the available time slot if there is at least one bid submitted for the time slot; and accepting bids having the highest bid amounts in the available time slots.

38. The computer readable medium of claim 31, wherein the user scheduled event records are used by a personal information manager (PIM) to provide calendaring information to the user independent of the use of the scheduled event records to generate the template indicating available time slots during for which bids may be submitted.

39. The computer readable medium of claim 31, further comprising:

displaying a calendar indicating the scheduled event records within the time period indicated in the request for bids, wherein the calendar is capable of enabling the user to modify scheduled event records and add scheduled event records to further limit the available time slots for which bids can be submitted.

40. The computer readable medium of claim 31, wherein the template displays the time slots indicated in the determined scheduled event records as unavailable.

41. The computer readable medium of claim 40, wherein each scheduled event record further provides a description of the scheduled event, wherein the template displaying the time slots indicated in the determined scheduled event records as unavailable does not display the description of the scheduled event.

* * * * *